US011982966B2

(12) United States Patent
Narita et al.

(10) Patent No.: US 11,982,966 B2
(45) Date of Patent: May 14, 2024

(54) SHEET FEEDING DEVICE AND IMAGE FORMING APPARATUS

(71) Applicant: CANON KABUSHIKI KAISHA, Tokyo (JP)

(72) Inventors: Saori Narita, Chiba (JP); Toshiki Ishida, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 281 days.

(21) Appl. No.: 17/463,732

(22) Filed: Sep. 1, 2021

(65) Prior Publication Data

US 2022/0082980 A1 Mar. 17, 2022

(30) Foreign Application Priority Data

Sep. 16, 2020 (JP) ................................ 2020-155237

(51) Int. Cl.

*B65H 1/26* (2006.01)
*B65H 3/06* (2006.01)
*B65H 3/54* (2006.01)
*G03G 15/00* (2006.01)

(52) U.S. Cl.

CPC ......... *G03G 15/6529* (2013.01); *B65H 1/266* (2013.01); *B65H 3/0684* (2013.01); *B65H 3/54* (2013.01); *B65H 2404/1521* (2013.01)

(58) Field of Classification Search

CPC ........ B65H 1/26; B65H 1/266; B65H 3/0684; B65H 3/54
USPC .......................................................... 271/162
See application file for complete search history.

(56) References Cited

U.S. PATENT DOCUMENTS 5,419,544 A * 5/1995 Ono ....................... B65H 1/266 271/157
8,387,971 B2 * 3/2013 Sunohara ............... B65H 1/266 271/171
9,027,920 B2 * 5/2015 Sato ....................... B65H 1/266 271/171
9,033,336 B2 * 5/2015 Washino .................. B65H 1/26 271/162
9,102,489 B2 * 8/2015 Uohashi ................. B65H 1/027
9,254,973 B2 2/2016 Ishida et al.
(Continued)

FOREIGN PATENT DOCUMENTS

JP H08-119464 A 5/1996
JP 2018-080047 A 5/2018

*Primary Examiner* — Leslie A Nicholson, III
(74) *Attorney, Agent, or Firm* — Venable LLP

(57) ABSTRACT

A sheet feeding device includes a sheet accommodating portion mounted in a main assembly. With respect to a crossing direction perpendicularly crossing a pulling-out direction of the sheet accommodating portion from the main assembly as viewed in a direction of gravitation, the main assembly is provided with a positioning portion. A member-to-be-engaged is provided in one of the main assembly and the sheet accommodating portion. An engaging member is provided in the other of the main assembly and the sheet accommodating portion. The engaging member is elastically deformed when the sheet accommodating portion is pulled out in the pulling-out direction from a mounting position. The engaging member is provided swingably in the other one of the main assembly and the sheet accommodating portion so as to be capable of changing a position thereof with respect to the crossing direction.

20 Claims, 7 Drawing Sheets

(56) References Cited

U.S. PATENT DOCUMENTS

| | | | | |
|---|---|---|---|---|
| 9,327,924 | B2 * | 5/2016 | Ishikura | B65H 9/00 |
| 9,415,958 | B2 * | 8/2016 | Kubota | B65H 1/266 |
| 9,422,123 | B2 * | 8/2016 | Maruta | B65H 1/04 |
| 9,504,028 | B2 * | 11/2016 | Pan | H04W 48/12 |
| 9,695,000 | B2 * | 7/2017 | Mizuguchi | B65H 3/5215 |
| 9,714,146 | B2 | 7/2017 | Ishida et al. | |
| 9,751,705 | B2 * | 9/2017 | Koda | G06K 15/16 |
| 10,053,310 | B2 * | 8/2018 | Nishiyama | B65H 1/04 |
| 10,399,802 | B2 | 9/2019 | Hayayumi et al. | |
| 10,479,627 | B2 | 11/2019 | Ishida | |
| 10,577,203 | B2 | 3/2020 | Ishida et al. | |
| 11,679,946 | B2 * | 6/2023 | Katafuchi | G03G 21/1647 271/162 |
| 2020/0165084 | A1 | 5/2020 | Ishida et al. | |

* cited by examiner (a)

(b)

(a)

(b)

SHEET FEEDING DEVICE AND IMAGE FORMING APPARATUS

FIELD OF THE INVENTION AND RELATED ART

The present invention relates to a sheet feeding device for feeding a sheet and an image forming apparatus for forming an image on the sheet.

In the image forming apparatus such as a copying machine, a printer or a facsimile machine, a constitution in which a sheet accommodating portion (also called a feeding cassette, a feeding tray, or the like) for accommodating sheets is detachably mounted in an apparatus main assembly and in which the sheets in the sheet accommodating portion are fed one by one automatically has been widely used. In Japanese Laid-Open Patent Application (JP-A) Hei 8-119464, a constitution in which an engaging member formed of an elastic plastic material is provided in an apparatus main assembly of an image forming apparatus and in which a member-to-be-engaged engaged with the engaging member is provided in a sheet feeding tray is described. When the sheet feeding tray is inserted into the apparatus main assembly, the member-to-be-engaged is nipped between two finger portions of the engaging member, so that the sheet feeding tray is brought into a mounting position and thus is positioned with respect to a mounting and dismounting direction relative to the apparatus main assembly.

SUMMARY OF THE INVENTION

A principal object of the present invention is to provide a sheet feeding device and an image forming apparatus which has further developed a conventional constitution.

According to an aspect of the present invention, there is provided a sheet feeding device comprising: a sheet accommodating portion mounted in a main assembly so as to be capable of being pulled out in a pulling-out direction from a mounting position in the main assembly; wherein with respect to a crossing direction perpendicularly crossing the pulling-out direction of the sheet accommodating portion from the main assembly as viewed in a direction of gravitation, the main assembly is provided with a positioning portion for positioning the sheet accommodating portion mounted at the mounting position, a member-to-be-engaged provided in one of the main assembly and the sheet accommodating portion; and an engaging member, provided in the other of the main assembly and the sheet accommodating portion, which is formed of an elastic material and which is configured to hold the sheet accommodating portion at the mounting position by being engaged with the member-to-be-engaged, wherein the engaging member is elastically deformed when the sheet accommodating portion is pulled out in the pulling-out direction from the mounting position, and wherein the engaging member is provided swingably in the other one of the main assembly and the sheet accommodating portion so as to be capable of changing a position thereof with respect to the crossing direction.

Further features of the present invention will become apparent from the following description of exemplary embodiments with reference to the attached drawings.

Figure 3:
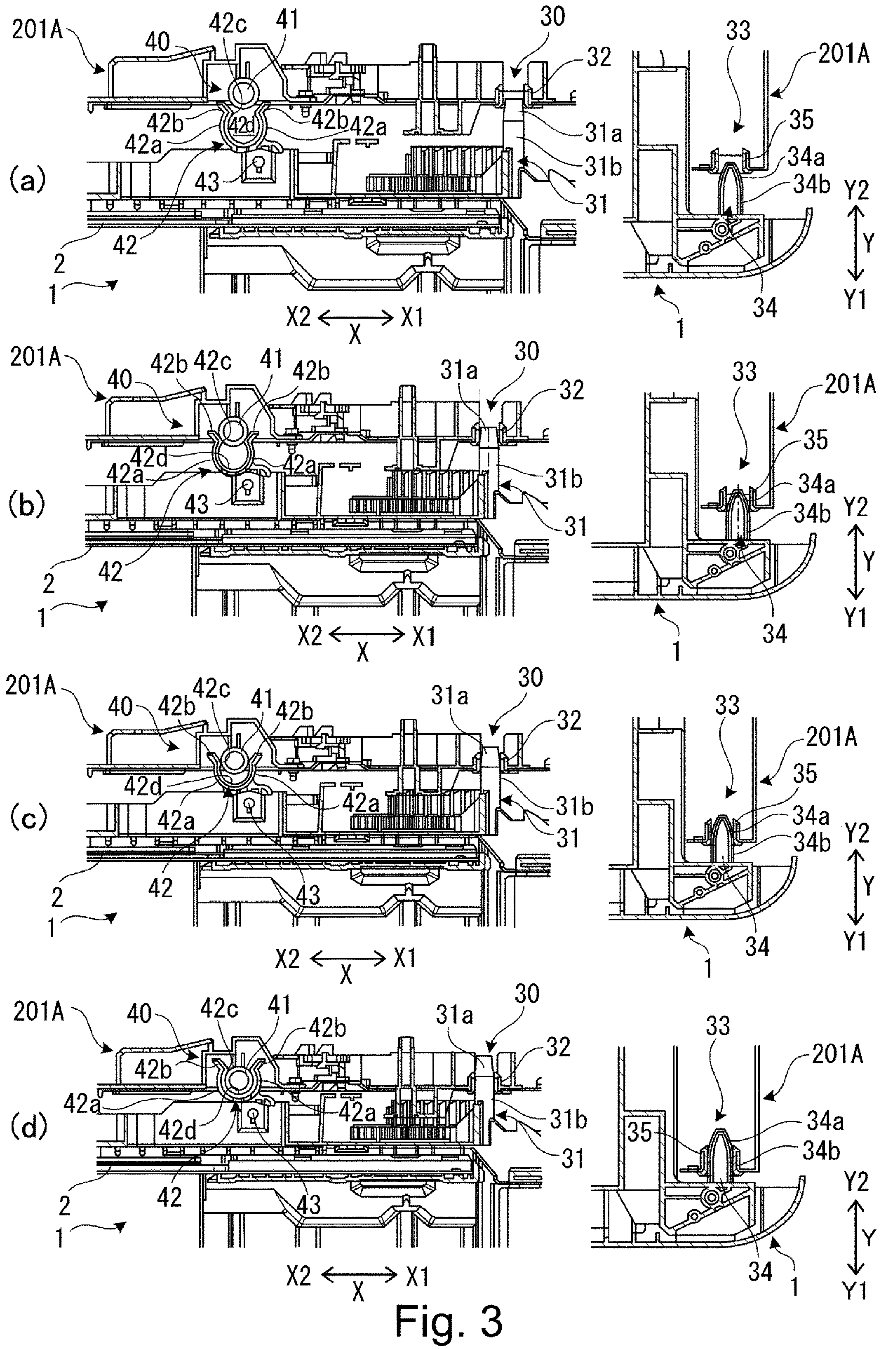

Parts (a) to (d) of FIG. 3 are schematic views for illustrating a mounting operation of the feeding cassette in the embodiment 1.

Figure 4:
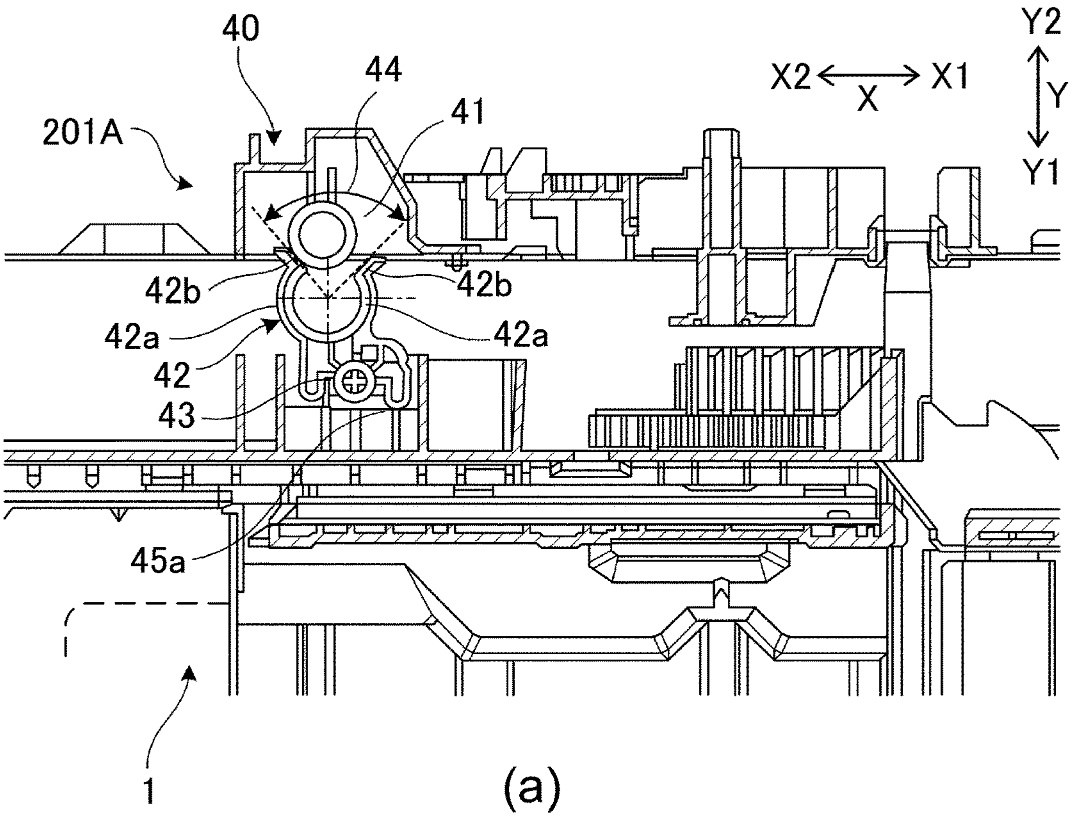
Figure 4:
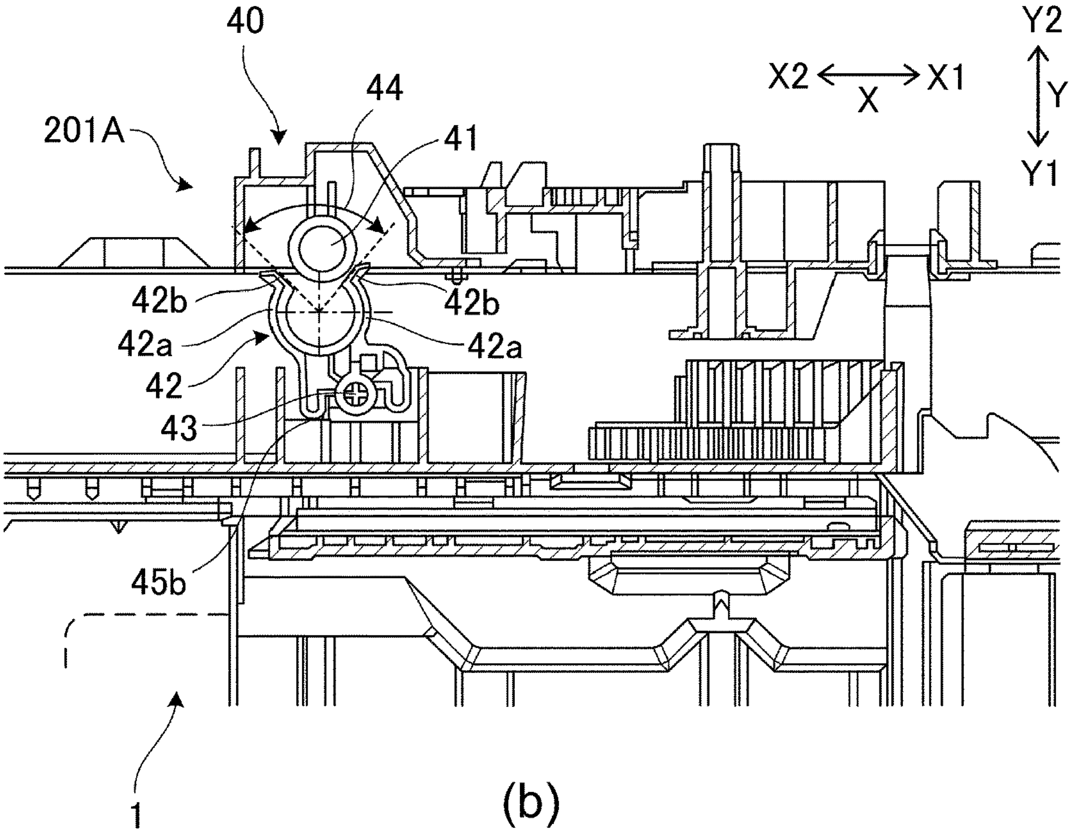

Parts (a) and (b) of FIG. 4 are schematic views for illustrating a swing range of an engaging arm in the embodiment 1.

Figure 5:
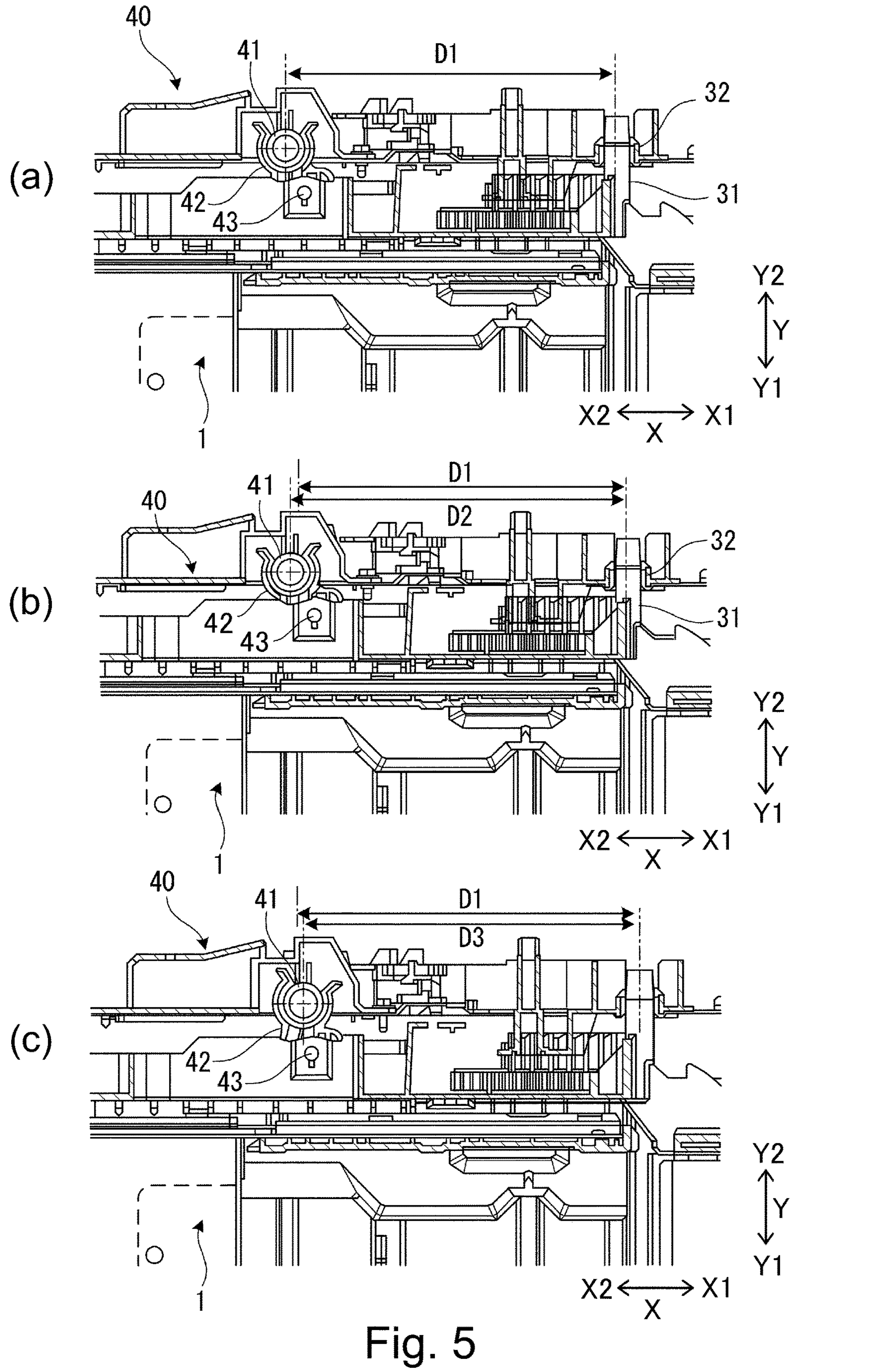

Parts (a) to (c) of FIG. 5 are schematic views for illustrating a positional relationship between the engaging arm and a positioning shaft in the embodiment 1.

Figure 6:
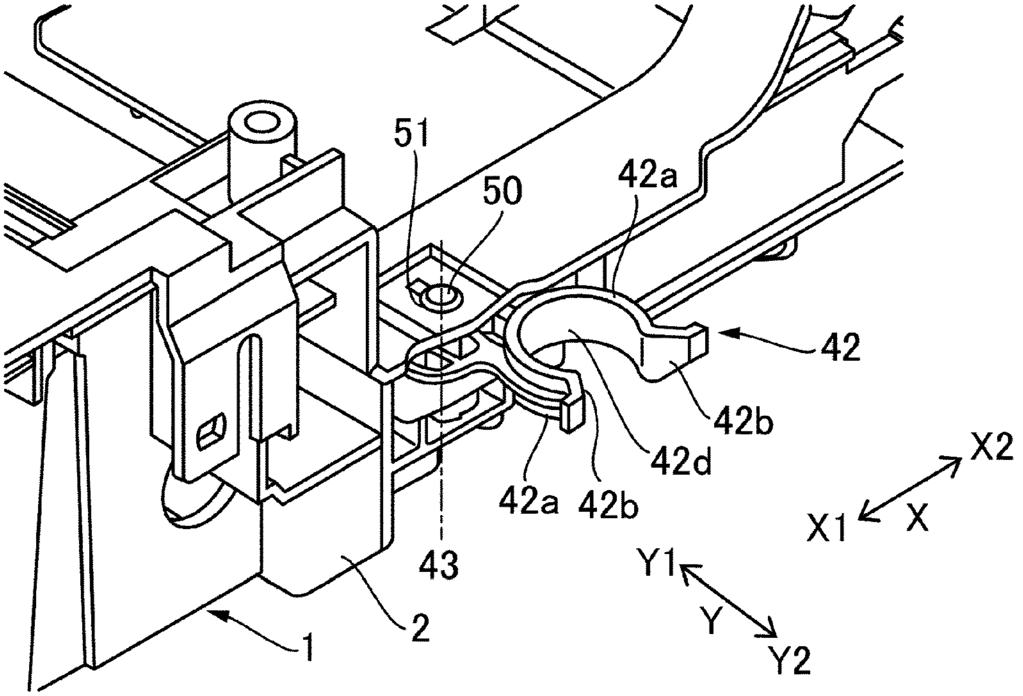
Figure 6:
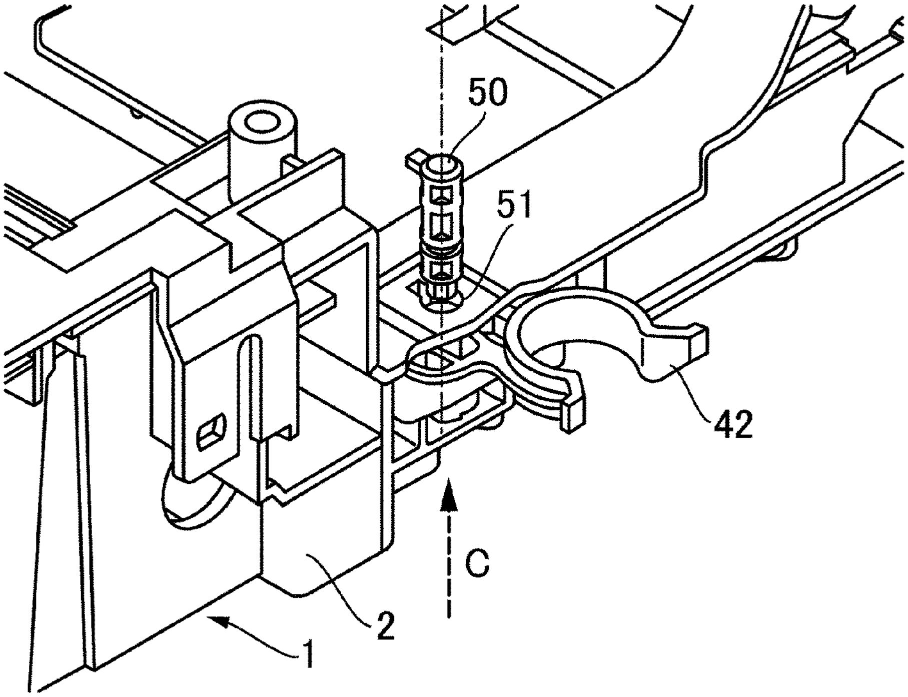

Parts (a) and (b) of FIG. 6 are schematic views for illustrating mounting and dismounting of the engaging arm in the embodiment 1.

Figure 7:
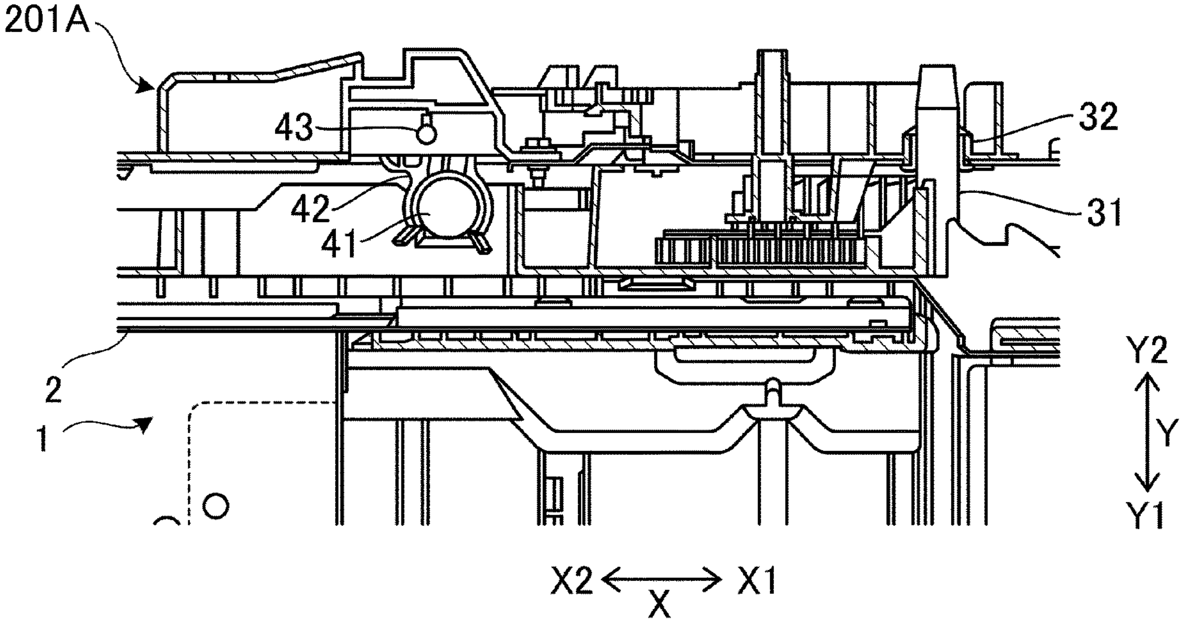

FIG. 7 is a schematic view showing an arrangement of an engaging arm and a boss member in an embodiment 2.

DESCRIPTION OF THE EMBODIMENTS

In the following, embodiments of the present invention will be described with reference to the drawings.

Embodiment 1

Figure 1:
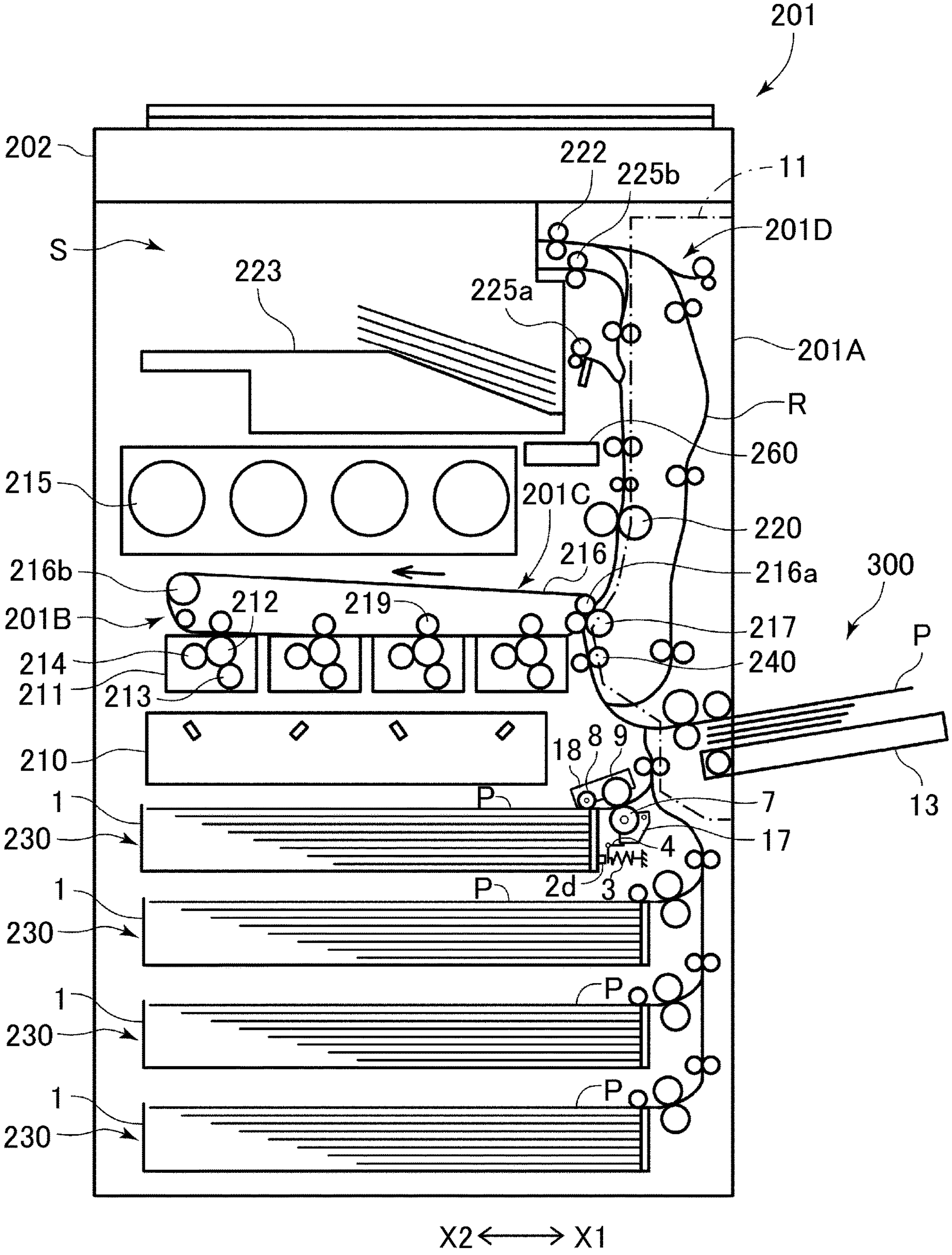
FIG. 1 is a schematic view of an image forming apparatus according to an embodiment 1.

FIG. 1 is a schematic view showing a cross-sectional structure of a full-color laser beam printer 201 which is an image forming apparatus according to this embodiment 1. The printer 201 forms an image on a sheet P used as a recording material (medium), on the basis of image information inputted from an external device or image information read from an original. The sheet P used as the recording material includes paper such as a form and an envelope, a plastic film for an overhead projector, and a cloth.

The printer 201 includes a printer main body 201A accommodating an image forming portion 201B and an image reading device 202 disposed on the printer main body 201A and for reading the image information from the original. With respect to an up-down direction (direction of gravitation), between the image reading device 202 and the printer main body 201A, a discharge space S into which the sheet P on which the image is formed is discharged is formed.

The image forming portion 201B which is an example of an image forming means is an electrophotographic unit of an intermediary transfer type including four process cartridges 211 and an intermediary transfer unit 201C. Each of the process cartridges 211 forms a toner image on a surface of a photosensitive drum 212 by an electrophotographic process. That is, when preparation of the toner image is required to the image forming portion 201B, the photosensitive drum 212 which is an image bearing member (electrophotographic photosensitive member) is rotationally driven, and the surface of the photosensitive drum 212 is electrically charged uniformly by a charging device 213. An exposure device 210 provided at a lower portion of the printer main body 201A irradiates the surface of the photosensitive drum 212 with laser light based on the image information, so that an electrostatic latent image is formed (written) on the photosensitive drum 212. A developing device 214 develops the electrostatic latent image on the surface of the photosensitive drum 212 into a toner image by using a developer including charged toner particles. Respective color toner images formed in the four process cartridges 211 are primary-transferred from the photosensitive drums 212 onto an intermediary transfer belt 216 by primary transfer rollers 219. A deposited matter such as toner remaining on the photosensitive drum 212 is removed by a cleaning device provided in each of the process cartridges 211.

The intermediary transfer unit 201C includes the intermediary transfer belt 216 which is an intermediary transfer member, and the intermediary transfer belt 216 is wound around an inner secondary transfer roller 216*a*, a tension roller 216*b*, and the like and is rotationally driven in the counterclockwise direction in the figure. The toner images carried on the intermediary transfer belt 216 are secondary-transferred onto the sheet P in a secondary transfer portion formed between the intermediary transfer belt 216 and a secondary transfer roller 217 opposing the inner secondary transfer roller 216*a* though the intermediary transfer belt 216. A deposited matter such as the toner remaining on the intermediary transfer belt 216 is removed by a cleaning device.

The sheet P on which the toner images are transferred is delivered to a fixing device 220. The fixing device 220 which is a fixing means in this embodiment includes a fixing roller 161 as a heating member, a pressing roller 162 for nipping the sheet in cooperation with the fixing roller 161, and a heat-generating member 163 (for example, a halogen lamp) as a heating means for heating the toner image on the sheet P. The fixing device 160 melts the toner by imparting heat and pressure to the toner image while feeding the sheet P, and thereafter the toner is fixed, so that the image is fixed on the sheet P.

In parallel to such an image forming process, the sheets P are fed one by one from a cassette feeding portion 230 or a multi-feeding portion 300 toward a registration roller pair 240. The cassette feeding portion 230 includes a feeding cassette 1 in which the sheets P are stacked and a feeding unit for feeding the sheet P from the feeding cassette 1. The feeding unit includes a pick-up roller 8 for sending the sheet P from the feeding cassette 1 and a feed roller 9 (feeding roller) for feeding the sheet P received from the pick-up roller 8. Further, a retard roller 7 which forms a nip in contact with the feed roller 9 and which separates the sheets P, one by one, fed by the feed roller 9 by applying a frictional force to the sheet P in the nip is provided.

To the retard roller 7, a driving force in a direction against rotation of the feed roller 9 is inputted via a torque limiter. When a single sheet P passes through the nip, the torque limiters slips, so that the retard roller 7 is rotated by the feed roller 9. On the other hand, when a plurality of sheets P enter the nip, the retard roller 7 rotates in the direction against the rotation of the feed roller and pushes back the sheet P to the feeding cassette 1. Such a retard roller 7 is an example of a separating member for separating the sheet P, and as the retard roller 7, a roller member connected to a fixed shaft via the torque limiter may be used and a pad-like elastic member may also be used.

The multi-feeding portion 300 includes a multi-tray 13 as a sheet supporting means and a feeding unit for feeding the sheet P set on the multi-tray 13. A structure of the feeding unit of a multi-feeding portion 300 is basically similar to the structure of the feeding unit of the cassette feeding portion 230. The multi-tray 13 is also called a multi-purpose tray or a manual feeding tray.

The sheet P fed from the cassette feeding tray 230 or the multi-feeding portion 300 is fed to the registration roller pair 240 via a sheet feeding passage in the printer main body 201A and then is subjected to oblique movement correction by the registration roller pair 240 put in a rest state. The sheet P subjected to the oblique movement correction is fed to the secondary transfer portion by the registration roller pair 240 at a timing in synchronism with the image forming process by the image forming portion 201B.

The sheet P on which the image is formed through passing of the secondary transfer portion and the fixing device 220 is discharged in the discharge space S by a first discharging roller pair 225*a* or a second discharging roller pair 225*b* and is stacked on a stacking portion 223. Incidentally, in the case of double-side printing, the sheet P on which the image is formed on a first surface thereof is reversely fed by a reversing roller pair 222 (switch-back feeding) and is delivered to a double-side feeding portion 201D, and then is fed again to the registration roller pair 240 via a re-feeding passage R. Thereafter, the sheet P on which an image is formed on a second surface thereof by being passed through the secondary transfer portion and the fixing device 230 is discharged in the discharge space S by the first discharging roller pair 225*a* or the second discharging roller pair 225*b*, so that the sheet P is stacked on the stacking portion 223.

The above-described image forming operation is controlled by a controller mounted in the printer main body 201A. Further, in the above description, the image forming portion 201B is an example of the image forming means, and as the image forming portion 201B, an electrophotographic unit of a direct transfer type or an image forming unit of an ink jet type or an offset printing type may also be used.

(Sheet Feeding Device)

Figure 2:
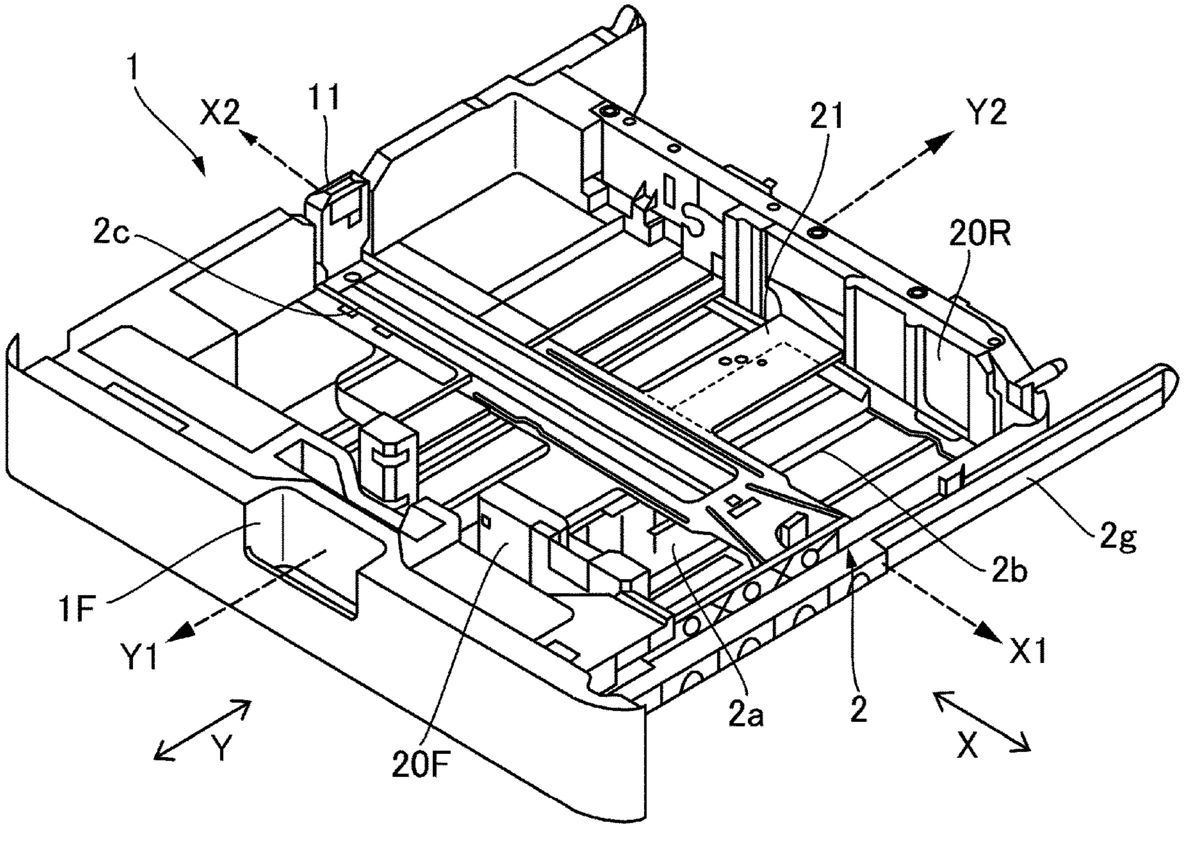
FIG. 2 is a perspective view of a feeding cassette in the embodiment 1.

The cassette feeding portion 230 which is a sheet feeding device of this embodiment will be further described. FIG. 2 is a perspective view showing a feeding cassette 1. The feeding cassette 1 as a sheet accommodating portion (also called a sheet stacking means) is mounted in the printer main body 201A (FIG. 1) as an apparatus main assembly so as to be capable of being pulled out (mounted in and dismounted from the printer main body 201A). Specifically, the feeding cassette 1 is pulled out in a pulling-out direction Y1 by operation of a grip portion 1F while being guided along rails provided at a guiding portion 2*g* in the printer main body 201A, and is mounted (inserted) toward a mounting direction Y2 opposite to the pulling-out direction. In the following, the pulling-out direction Y1 and the mounting direction Y2 are referred to as a mounting and dismounting direction Y of the feeding cassette 1. Incidentally, the pulling-out direction Y1 is a frontward direction of the printer 1 shown in FIG. 1, and the mounting direction Y2 is backward (rearward) direction of the printer 1. The mounting and dismounting direction Y is a front-rear direction of the printer 1.

The sheet P stacked in the feeding cassette 1 is fed from the feeding cassette 1 toward a feeding direction X1 by the feed roller 9 or the like described using FIG. 1. The feeding direction X1 in this embodiment is a crossing direction perpendicularly crossing the mounting and dismounting direction Y as viewed from above. In the following, the feeding direction X1 and a direction X2 opposite thereto and referred to as a left-right direction X. Incidentally, the left-right direction X is also a left-right direction in the case where the printer 201 shown in FIG. 1 is viewed from the front side.

The feeding cassette 1 includes a substantially box-shaped (tray-like) cassette frame 2 opening or an upper side thereof, a stacking plate 21, side restricting portions 20F and 20R, and a trailing end restricting portion 11. The stacking plate 21 is rotatably supported by the cassette frame 2 and is capable of being raised and lowered in a state in which sheets are stacked at an upper surface thereof. The side restricting portions 20F and 20R is provided on one side and the other side with respect to a sheet widthwise direction (i.e., the mounting and dismounting direction Y) perpendicular to the feeding direction X1, and is mounted movably in the sheet widthwise direction along a rail 2*b* provided at a bottom 2*a* of the cassette frame 2. The trailing end restricting portion 11 is mounted movably in the feeding direction X1 along a rail 2*c* provided at the bottom 2*a* of the cassette frame 2. The side restricting portions 20F and 20R, and the trailing end restricting portion 11 contact end portions of the sheets stacked on the stacking plate 21 and thus restrict positions of the sheets set in the feeding cassette 1. Further, depending on a sheet size, positions of the side restricting portions 20F and 20R, and the trailing end restricting portion 11 are changed, so that sheets with various sizes can be accommodated in the feeding cassette 1.

(Positioning Portion and Engaging Portion)

Next, a constitution for holding and positioning the feeding cassette 1 in a mounting state will be described using parts (a) to (d) of FIG. 3. Left sides of parts (a) to (d) of FIG. 3 are sectional views of a rear portion (downstream portion of the mounting direction Y2) of the feeding cassette 1 and the printer main body 201A as viewed from above. Right sides of parts (a) to (d) of FIG. 3 are sectional views of a front portion (upstream portion of the mounting direction Y2) of the feeding cassette 1 and the printer main body 201A as viewed from above.

As shown in the left side of part (a) of FIG. 3, at the rear portion of the feeding cassette 1, an engaging arm 42 as an engaging member is provided. The printer main body 201A is provided with a boss member 41 as a member-to-be-engaged on a rear side (downstream side of the mounting direction Y2) of a space for accommodating the feeding cassette 1 (hereinafter, this space is referred to as a cassette mounting space). The engaging arm 42 and the boss member 41 pull the feeding cassette 1 into the mounting position in the printer main body 201A (in the apparatus main assembly) and constitute an engaging portion 40 for positioning the feeding cassette 1 with respect to the mounting and dismounting direction Y.

Further, at the rear portion of the feeding cassette 1, a positioning shaft 31 as a first portion-to-be-positioned is provided. The printer main body 201A is provided with a bearing portion 32 as a first positioning portion on the rear side of the cassette mounting space. The positioning shaft 31 and the bearing portion 32 constitute a rear-side positioning mechanism 30 (first positioning mechanism) for positioning the feeding cassette 1 with respect to the left-right direction X.

As shown in the right side of part (a) of FIG. 3, at the front portion of the feeding cassette 1, positioning shaft 34 as a second portion-to-be-positioned is provided. The printer main body 201A is provided with a bearing portion 35 as a second positioning portion at a position opposing the positioning shaft 34. The positioning shaft 34 and the bearing portion 35 constitute a front-side positioning mechanism 33 for positioning the feeding cassette 1 with respect to the left-right direction X.

These engaging portion 40, rear-side positioning mechanism 30 and front-side positioning mechanism 33 have a function of restricting movement of the feeding cassette 1 mounted at a predetermined mounting position in the printer main body 201A and of holding the feeding cassette 1 in the mounting position. In the following, members constituting the engaging portion 40, the rear-side positioning mechanism 30, and the front-side positioning mechanism 33 will be specifically described.

(1) Engaging Portion

The engaging arm 42 made of a resin material projects from the cassette frame 2 toward the downstream side of the mounting direction Y2 and is supported by the cassette frame 2 so as to be swingable about a swing axis 43. The swing axis may preferably be an axis extending in the up-down direction (direction of gravitation). The boss member 41 is substantially cylindrical member extending in the up-down direction which is a direction substantially parallel to the swing axis 43 of the engaging arm 42, and is fixed to a frame of the printer main body 201A.

The engaging arm 42 includes two claw portions (arm portions) 42*a* and guiding portions 42*b* provided at free ends of the claw portions 42*a*. By the two claw portions 42*a*, a locking portion 42*d* which is recessed portion for receiving the boss member 41 is formed (see also part (a) of FIG. 6). The locking portion 42*d* is, for example, provided at an arcuate surface (part of a cylindrical surface larger in center angle than 180°) as viewed from above. An inner diameter of the locking portion 42*d* is set so as to be substantially equal to an outer diameter of the boss member 41 as viewed from above.

The locking portion 42*d* has a recessed shape such that as viewed from above, the locking portion 42*d* is open toward the downstream side of the mounting direction Y2 via an opening between two narrow portions 42*c* each positioned at a boundary between the claw portion 42*a* and the guiding portion 42*b*. A distance between the two narrow portions 42*c* which is an opening width of the engaging arm 42 is set so as to be smaller than a width of the boss member 41 with respect to the left-right direction X. The two guiding portions 42*a* are formed so that an interval therebetween with respect to the left-right direction increases from the narrow portions 43*c* toward the downstream side of the mounting direction Y2 becomes larger than a maximum width of the boss member 41.

In the case where the two guiding portions 42*a* are pressed by the boss member 41, the two claw portions 42*a* have elasticity such that the two claw portions 42*a* are capable of elastically deforming so that the distance between the narrow portions 42*c* increases to a width in which the boss member 41 is capable of passing.

(2) Rear-Side Positioning Mechanism and Front-Side Positioning Mechanism

As shown in the left side of part (a) of FIG. 3, the positioning shaft 31 in a member supported by the cassette frame 2 and extending toward the mounting direction Y2. The positioning shaft 31 includes a cylindrical portion 31*b* with a certain outer diameter and a tapered portion 31*a* continuously extending from the cylindrical portion 31*b* in the mounting direction Y2 and decreasing in outer diameter toward the mounting direction Y2. The tapered portion 31*a* has a guiding function for realizing smooth engagement between the positioning shaft 31 and the bearing portion 32.

The bearing portion 32 is a portion fixed to the frame of the printer main body 201A and forming a hole extending in the mounting direction Y2 at a position opposing the positioning shaft 31. An inner diameter of the bearing portion 32 is set so as to be substantially equal to the outer diameter of the cylindrical portion 31*b* of the positioning shaft 31.

As shown in the right side of part (a) of FIG. 3, the positioning shaft 34 in a member supported by the cassette frame 2 and extending toward the mounting direction Y2. The positioning shaft 34 includes a cylindrical portion 34*b* with a certain outer diameter and a tapered portion 34*a* continuously extending from the cylindrical portion 34*b* in the mounting direction Y2 and decreasing in outer diameter toward the mounting direction Y2. The tapered portion 34*a* has a guiding function for realizing smooth engagement between the positioning shaft 34 and the bearing portion 35.

The bearing portion 35 is a portion fixed to the frame of the printer main body 201A and forming a hole extending in the mounting direction Y2 at a position opposing the positioning shaft 34. An inner diameter of the bearing portion 35 is set so as to be substantially equal to the outer diameter of the cylindrical portion 34*b* of the positioning shaft 34.

A difference between each of the inner diameters of the bearing portions 32 and 35 and each of the outer diameters of the cylindrical portions 31*b* and 31*d* of the positioning shafts 31 and 34 determines positional accuracy of the feeding cassette 1 with respect to the left-right direction X in the mounted state. The difference between each of the inner diameters of the bearing portions 32 and 35 and each of the outer diameters of the cylindrical portions 31*b* and 34*b* is smaller than play with respect to the left-right direction X at the engaging portion between the rail of the printer main body 201A and the guiding portion 2*g* (FIG. 2) of the feeding cassette 1. Incidentally, in place of the tapered portions 31*c* and 34*a*, tapered portions each increasing in inner diameter toward the upstream side of the mounting direction Y2 are provided at the bearing portion 32 and 35, so that a guiding function may also be provided.

(Operation During Mounting and Dismounting)

Operations of the engaging portion 40, the rear-side positioning mechanism 30, and the front-side positioning mechanism 33 when the feeding cassette 1 is mounted will be described along parts (a) to (d) of FIG. 3.

Part (a) of FIG. 3 shows a state during insertion of the pulled-out feeding cassette 1 in the mounting direction Y2 toward the mounting position of the printer main body 201A. In the rear-side positioning mechanism 30 and the front-side positioning mechanism 33, first, tapered portions 31*a* and 34*a* of the positioning shafts 31 and 34 enter the bearing portions 32 and 35, respectively. The engaging arm 42 does not contact the boss member 41 yet.

As shown in part (b) of FIG. 3, with movement of the feeding cassette 1 in the mounting direction Y2, by the tapered portions 31*a* and 34*a*, the positioning shafts 31 and 34 are guided so that center lines thereof coincide with center lines of the bearing portions 32 and 35, respectively. Further, the guiding portions 42*b* of the engaging arm 42 contact an outer peripheral surface of the boss member 41. Here, in the case where the opening of the engaging arm 42 does not face toward a center of the boss member 41, the engaging arm 42 is swung so that the opening thereof faces toward the center of the boss member 41, by early contact of either one of the guiding portions 42*b* with the boss member 41.

As shown in part (c) of FIG. 3, when the feeding cassette 1 is further moved in the mounting direction Y2, the cylindrical portions 31*b* and 34*b* of the positioning shafts 31 and 34 start to engage with the bearing portions 32 and 35, respectively. Further, the boss member 41 presses the guiding portions 42*b*, so that the two claw portions 42*a* are elastically deformed so that the distance between the narrow portions 42*c* is increased. By this, a largest width portion of the boss member 41 passes through between the narrow portions 42*c*. After the largest width portion of the boss member 41 passes through between the narrow portions 42*c*, the two claw portions 42*a* are liable to narrow by an elastic force, so that the boss member 41 is guided toward the rear side of the locking portion 42*d* and a force (pulling force) in the mounting direction Y2 acts on the feeding cassette 1.

As shown in part (d) of FIG. 3, when the center of the boss member 41 reaches a position substantially coinciding with a center of the locking portion 42*d*, movement of the feeding cassette 1 in the mounting direction Y2 stops. In this state, the boss member 41 contacts the locking portion 42*d*, and therefore, further movement of the feeding cassette 1 in the mounting direction Y2 is restricted. Further, the elastic force of the two claw portions 42*a* acts on the boss member 41 in a direction in which dismounting of the boss member 41 is restricted, and therefore, movement of the feeding cassette 1 in the pulling-out direction Y1 is also restricted. Accordingly, by engagement between the engaging arm 42 and the boss member 41, the feeding cassette 1 is held in the mounted state, and the feeding cassette 1 is positioned with respect to the mounting and dismounting direction Y.

Further, in the rear-side positioning mechanism 30 and the front-side positioning mechanism 33, the cylindrical portions 31*b* and 34*b* of the positioning shafts 31 and 34 engage with the bearing portions 32 and 35, respectively. By this, the feeding cassette 1 is positioned with respect to the left-right direction X crossing the mounting and dismounting direction Y. Further, both the rear side and the front side of the mounting direction Y2, so that turn (rotation as viewed from above) of the feeding cassette 1 is also restricted.

Incidentally, the start of the engagement of the cylindrical portions 31*b* and 34*b* of the positioning shafts 31 and 34 with the bearing portions 32 and 35, respectively, is set at a timing after the largest width portion of the boss member 41 passes through between the narrow portions 42*c* of the engaging arm 42 and before the boss member 41 reaches the locking portion 42*d*. By this, the feeding cassette 1 can be maintained at the mounting position in a state in which positional accuracy of the feeding cassette 1 with respect to the left-right direction X is ensured.

(Swing Range of Engaging Arm)

By using parts (a) and (b) of FIG. 4, a swing range in which the engaging arm 42 in this embodiment is swingable will be described. Parts (a) and (b) of FIG. 4 are schematic views of the engaging arm 42 and a periphery thereof as viewed from above, and show a state immediately before the bearing portion 42*c* contacts the boss member 41 when the feeding cassette 1 is inserted from the upstream side toward the downstream side of the mounting direction Y2.

In part (a) of FIG. 4, the engaging arm 42 is positioned with a limiting angle in the swing range with respect to the clockwise direction, and in part (b) of FIG. 4, the engaging arm 42 is positioned with a limiting angle in the swing range with respect to the counterclockwise direction. The cassette frame 2 is provided with restricting surfaces 45*a* and 45*b*, and by contact of a contact portion of the engaging arm 42 with either one of the restricting surfaces 45*a* and 45*b*, the swing range of the engaging arm 42 is limited.

The swing range of the engaging arm 42 is set so that guiding of the boss member 41 by the guiding portions 42*b* is enabled even when the engaging arm 42 is positioned with any angle within the swing range. That is, even in either state of parts (a) and (b) of FIG. 4, the swing range is limited so that the boss member 41 is positioned in a region 44 inside phantom lines extending in a V-shape toward the downstream side of the mounting direction Y2 along the two guiding portions 42*b*. By this, irrespective of the angle of the engaging arm 42 before the mounting of the feeding cassette 1, the engaging arm 42 can be reliably engaged with the boss member 41 in response to the mounting of the feeding cassette 1.

(Absorption of Tolerance or the Like by Swing of Engaging Arm)

Further, the swing range of the engaging arm 42 is set in consideration of a variation in positional relationship between members due to a part tolerance, an assembling tolerance, and the like. By using parts (a) to (c) of FIG. 5, absorption of the variation by the swing of the engaging arm 42.

As shown in part (a) of FIG. 5, a distance (center distance) between the positioning bearing portion 32 and the boss member 41 with respect to the left-right direction X is constituted by a nominal distance D1. Correspondingly thereto, in a state in which the engaging arm 42 is in a neutral position (center of the swing range), the engaging arm 42 and the positioning shaft 31 are disposed so that a distance from the center of the positioning shaft 31 to the center of the locking portion 42*d* of the engaging arm 42 equal to the nominal distance D1.

As shown in part (b) of FIG. 5, it is assumed that a distance D2 between the bearing portion 32 and the boss member 41 with respect to the left-right direction X became larger than the nominal distance D1 due to the part tolerance, the assembling tolerance, and the like. In this case, the engaging arm 42 engages with the boss member 41 in a state in which the engaging arm 42 swings about the swing shaft 43 in the counterclockwise direction. Further, as shown in part (c) of FIG. 5, it is assumed that a distance D3 between the bearing portion 32 and the boss member 41 with respect to the left-right direction X became smaller than the nominal distance D1 due to the part tolerance, the assembling tolerance, and the like. In this case, the engaging arm 42 engages with the boss member 41 in a state in which the engaging arm 42 swings about the swing shaft 43 in the clockwise direction.

If the engaging arm 42 is a member fixed to the cassette frame 2, it is assumed that the engaging arm 42 and the positioning shaft 31 are engaged with the boss member 41 and the bearing portion 32, respectively, in the state shown in part (b) or part (c) of FIG. 5. In this case, due to a difference between a distance between the engaging arm 42 and the positioning shaft 31 and a distance between the boss member 41 and the bearing portion 32, stress acts on each of the members, so that there is a possibility that creep deformation occurs at the claw portions 42*a* of the engaging arm 42. Further, there is a possibility that breaking of the members occurs due to collision of the end portion of the guiding portion 42*b* of the engaging arm or the positioning shaft 31 to the boss member 41 or the bearing portion 32 during the mounting of the feeding cassette 1. When such a deformation or breaking of the members occurs, the functions of pulling-in and positioning by the engaging portion 40 and of positioning by the rear-side positioning mechanism 30 lower, and there is a liability that the mounting and dismounting of the feeding cassette 1 are prevented.

On the other hand, in this embodiment, the variation in positional relationship between the members due to the part tolerance, the assembling tolerance, and the like is absorbed by the engaging arm 42 swingably in the direction crossing the mounting and dismounting direction Y, and therefore, the possibility that the deformation and the breaking of the members occur is decreased. Accordingly, a lowering in functions of the pulling-in and the positioning by the engaging portion 40 and the rear-side positioning mechanism 30 is suppressed, and the feeding cassette 1 is capable of being smoothly mounted and dismounted.

(Decrease in Creep Deformation or the Like in Cassette Mounting State)

Further, in this embodiment, a constitution in which the engaging arm 42 is swingable in the left-right direction X, and therefore, even in the case where a force in the left-right direction X acts on the feeding cassette 1 in the mounted state of the feeding cassette 1, description that a degree of the creep deformation of the engaging arm 42 can be decreased will be made.

As an example of the force in the left-right direction X acting on the feeding cassette 1 in the mounted state of the feeding cassette 1, it is possible to cite an urging member used in a mechanism for moving the roller member for sheet feeding (conveyance) in interrelation with the mounting and dismounting of the feeding cassette 1. An urging spring 4 shown in FIG. 1 is an example of the urging member and urges a roller spacing lever 3 as a member-to-be-pressed. The roller spacing lever 3 includes a portion-to-be-pressed 3*a* projecting in the cassette mounting space by an urging force of the urging spring 4 in a state in which the feeding cassette 1 is pulled out, and is swung by being pressed by a pressing portion 2*d* provided in the feeding cassette 1, with the mounting of the feeding cassette 1.

Here, the pick-up roller 7 is rotatably held by a roller holder 18, and the roller holder 18 is swingably supported by the frame of the printer main body 201A, so that the retard roller 7 is constituted so as to be capable of being raised and lowered (capable of being contacted to and spaced from the sheet). Further, the retard roller 7 is rotatably supported by a roller holder 17, and the roller holder 17 is swingably supported by the frame of the printer main body 201A, so that the retard roller 7 is capable of being contacted to and spaced from the feed roller 9.

Further, each of the roller holders 18 and 17 is constituted so as to move in interrelation with the roller spacing lever 3. That is, in the state in which the feeding cassette 1 is mounted in the printer main body 201A, the portion-to-be-pressed 3*a* is pressed by the pressing portion 2*d*, so that the roller spacing lever 3 is held in a position of FIG. 1 against the urging force of the urging spring 4. In this state, the pick-up roller 8 is held in a feeding position contactable to an upper surface of the sheet P in the feeding cassette 1, and the retard roller 7 is held in a contact position contacting the feed roller 9. On the other hand, when the feeding cassette 1 is pulled out from the printer main body 201A, the roller spacing lever 3 is rotated by the urging force of the urging spring 4 by being released from the urging (pressing) by the portion-to-be-pressed 3*a*. In this state, the pick-up roller 8 is retracted to a retracted position above the feeding position, and the retard roller 7 is moved to a spaced position spaced from the feed roller 9.

Incidentally, as a mechanism for moving the roller holders 18 and 17 in interrelation with the roller spacing lever 3, a known mechanism is applicable. For example, as disclosed in JP-A 2018-80047, the roller holder 17 is swung by pressing the portion-to-be-pressed, provided on the roller holder 17, by the roller spacing lever 3, and the roller holder 18 is swung by another lever member pressed by the roller spacing lever 3. Further, the roller spacing lever 3 and the urging spring 4 shown in FIG. 1 are illustrative ones, and are capable of being appropriately changed in shape, arrangement, directions of rotation shafts, rotational directions, and the like.

Incidentally, in the mounted state of the feeding cassette 1, by the urging force of the urging spring 4, the roller spacing lever 3 presses the feeding cassette 1 toward the left side (in the direction X2 opposite to the feeding direction X1 of the sheet P) in FIG. 1. If such a press force acts on the engaging portion 40 for a long term, the creep deformation occurs at the claw portions 42*a* of the engaging arm 42, so that the functions of the pulling-in and the positioning by the engaging portion 40 lower and there is a liability that the mounting and dismounting of the feeding cassette 1 are prevented.

On the other hand, in this embodiment, a constitution in which positioning of the feeding cassette 1 with respect to the left-right direction X is carried out by the rear-side positioning mechanism 30 and the front-side positioning mechanism 33 and in which the engaging arm 42 is made swingable in the left-right direction X is employed. For this reason, the urging force of the urging spring 4 can be received by the rear-side positioning mechanism 30 and the front-side positioning mechanism 33, so that the possibility of the occurrence of the creep deformation at the claw portions 42*a* of the engaging arm 42 can be reduced. That is, according to this embodiment, in the case where the urging member is used as a part of the mechanism for moving the roller member in interrelation with the mounting and dismounting of the feeding cassette 1, it is possible to reduce the possibility that the creep deformation of the engaging member due to the urging force of the urging member occurs.

(Mounting Constitution of Engaging Arm)

Here, a mounting constitution of the engaging arm 42 to the feeding cassette 1 will be described using parts (a) and (b) of FIG. 6. Part (a) of FIG. 6 is a perspective view showing the engaging arm 42 in a mounted state, and part (b) of FIG. 6 is a perspective view showing a mounting method of a connecting pin 50 as a mounting member in this embodiment.

As shown in part (b) of FIG. 6, the cassette frame 2 of the feeding cassette 1 is provided with a connecting hole 51 penetrating the cassette frame 2 in the up-down direction. Further, the engaging arm 42 is also provided with a hole penetrating the engaging arm 42 in the up-down direction. The connecting pin 50 is a substantially cylindrical member and is mounted from above so as to penetrate the connecting hole 51 and the hole of the engaging arm 42. In the mounted state shown in part (a) of FIG. 6, the engaging arm 42 swings about a center, as the swing axis 43, of the connecting pin 50. By such a constitution, the engaging arm 42 as a swingable engaging member can be easily mounted.

Incidentally, the connecting pin 50 inserted in the connecting hole 51 is fixed in the cassette frame 2 by an unshown snap-fitting constitution. Further, by pressing the connecting pin 50 from below in an arrow C direction, the connecting pin 50 can be easily dismounted from the cassette frame 2. That is, the connecting pin 50 is capable of being mounted in and dismounted from the feeding cassette 1.

Embodiment 2

As an embodiment 2, a constitution example in which the engaging arm 42 as the engaging member is disposed in the printer main body 201A and in which the boss member 41 as the member-to-be-engaged is disposed in the feeding cassette 1 will be described. In the following, elements represented by reference numerals or symbols common to the embodiments 1 and 2 have substantially the same constitutions and actions, and in this embodiment, a portion different from the embodiment 1 will be described.

As shown in FIG. 7, the engaging arm 42 of this embodiment is supported by the frame of the printer main body 201A and is swingable about the swing axis 43 in a direction (preferably in the left-right direction X) crossing the mounting and dismounting direction Y of the feeding cassette 1. On the other hand, the boss member 41 is mounted on the cassette frame 2 of the feeding cassette 1.

Even when such a constitution is employed, by engagement between the engaging arm 42 and the boss member 41, a pulled-in function of the feeding cassette 1 and a positioning function of the feeding cassette 1 with respect to the mounting and dismounting direction Y can be obtained. Further, a variation in positional relationship between members due to the part tolerance and assembling tolerance and the like is absorbed by the engaging arm 42 swingable in the direction crossing the mounting and dismounting direction Y, and therefore, degrees of deformation and breaking of the members can be reduced. Further, a possibility of occurrence of creep deformation of the engaging member due to the urging force of the urging member can be reduced.

Modified Embodiments

In the embodiments 1 and 2, the cylindrical boss member 41 was illustrated as the member-to-be-engaged, but for example, a member-to-be-engaged with a polygonal shape or a spindle shape as viewed from above may also be used. That is, an arbitrary shape such that a portion-to-be-locked is provided on an upstream side of the mounting direction Y2 and that a portion narrower in width than the portion-to-be-locked crossing perpendicular to the mounting direction Y2 is provided can be used. Further, the engaging member can receive the portion-to-be-locked by a locking portion by utilizing elasticity, and after reception, the portion-to-be-locked may only be required to generate a mechanical retaining force for restricting getting out of the portion-to-be-locked, so that the shape of the engaging member is not limited to the shape illustrated in part (a) of FIG. 3 or the like.

In the embodiments 1 and 2, as the portion-to-be-positioned, the substantially cylindrical positioning shafts 31 and 34 extending in the mounting direction Y2 of the feeding cassette 1 was illustrated, but as the portion-to-be-positioned, one with a polygonal shape or a flat plate-like member extending so as to cross the left-right direction X may also be used. In this case, the positioning portion may only be required to change in shape to an appropriate shape capable of restricting a positional deviation with respect to the left-right direction X of the feeding cassette 1. Further, the positioning shafts 31 and 34 may be provided in the printer main body 201A, and the bearing portions 32 and 35 may also be provided in the feeding cassette 1.

Another Embodiment

In the above-described embodiments, the sheet feeding device provided as a part of the printer 201 as the image forming apparatus was described, but the present invention may also be applied to a sheet feeding device (option feeder) used in connection to the printer, for example. In that case, the apparatus main assembly refers to an apparatus main assembly (portion excluding the sheet accommodating portion) of the sheet feeding device other than the printer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-155237 filed on Sep. 16, 2020, which is hereby incorporated by reference herein in its entirety.

What is claimed is:

1. A sheet feeding device comprising:

a sheet accommodating portion mounted in a main assembly so as to be capable of being pulled out in a pulling-out direction from a mounting position, wherein with respect to a crossing direction perpendicularly crossing the pulling-out direction of said sheet accommodating portion from the main assembly as viewed in a direction of gravitation, the main assembly is provided with a positioning portion for positioning said sheet accommodating portion mounted at the mounting position;

an engaged member provided in one of the main assembly and said sheet accommodating portion; and an engaging member, provided in the other of the main assembly and said sheet accommodating portion, which is formed of an elastic material and which is configured to hold said sheet accommodating portion at the mounting position by being engaged with said engaged member, wherein said engaging member is elastically deformed by the engaged member and is arranged such that an elastic force of said engaging member is used to pull said sheet accommodating portion in a direction, opposite to the pulling-out direction, toward the mounting position, and wherein said engaging member is provided swingably in the other one of the main assembly and said sheet accommodating portion so as to be capable of changing a position thereof with respect to the crossing direction.

2. A sheet feeding device according to claim 1, wherein said engaged member is provided in the main assembly, wherein said sheet feeding device further comprises a mounting member mounted so as to be mountable in and dismountable from said sheet accommodating portion, and wherein said engaging member is mountable in and dismountable from said sheet accommodating portion by mounting and dismounting of said mounting member.

3. A sheet feeding device according to claim 2, wherein said engaged member is swingable about said mounting member.

4. A sheet feeding device according to claim 1, further comprising an urging member configured to urge said sheet accommodating portion in the crossing direction in a state in which said sheet accommodating portion is mounted at the mounting position.

5. A sheet feeding device according to claim 4, further comprising:

a feeding roller configured to feed, toward one side of the crossing direction, sheets stacked in said sheet accommodating portion;

a separating member movable between a contact position where said separating member contacts said feeding roller and form a nip therebetween and a spaced position where said separating member is spaced from said feeding roller and configured to separate the sheets, fed by said feeding roller, one by one in the nip; and a pressed member configured to be pressed by said sheet accommodating portion in the crossing direction with mounting of said sheet accommodating portion into the main assembly so as to move said separating member from the spaced position to the contact position, wherein said urging member urges said pressed member toward said sheet accommodating portion in the crossing direction.

6. A sheet feeding device according to claim 4, further comprising:

a pick-up roller movable between a feeding position where said pick-up roller feeds the sheet to one side of the crossing direction in contact with an upper surface of the sheet stacked in said sheet accommodating portion and a retracted position above the feeding position;

a pressed member configured to be pressed by said sheet accommodating portion in the crossing direction with mounting of said sheet accommodating portion into the main assembly so as to move said pick-up roller from the retracted position to the feeding position, wherein said urging member urges said pressed member toward said sheet accommodating portion in the crossing direction.

7. A sheet feeding device according to claim 1, wherein said engaging member includes a recessed portion configured to receive said engaged member in a state in which said sheet accommodating portion is in the mounting position and includes guiding portions configured to guide said engaged member toward said recessed portion when said sheet accommodating portion is mounted into the main assembly.

8. A sheet feeding device according to claim 7, wherein said sheet accommodating portion includes a restricting portion configured to restrict a swing range of said engaging member, and wherein said guiding portions are formed so as to guide said engaged member toward said recessed portion even in a state in which said engaging member is in any position within the swing range restricted by said restricting portion.

9. A sheet feeding device according to claim 7, wherein said engaging member includes two claw portions forming said recessed portion, and between said two claw portions, an opening where said recessed portion opens toward a downstream side of a mounting direction of said sheet accommodating portion, wherein with respect to the crossing direction, a width of said opening is narrower than a width of said engaged member, and wherein said guiding portions are provided at free ends of said two claw portions and are disposed so that an interval therebetween with respect to the crossing direction is made broader than the width of said engaged member toward the downstream side of the mounting direction.

10. A sheet feeding device according to claim 1, wherein said engaged member is provided in the main assembly, and wherein said engaging member is provided in said sheet accommodating portion so as to be swingable.

11. A sheet feeding device according to claim 1, wherein said engaged member is provided in said sheet accommodating portion, and wherein said engaging member is provided in the main assembly so as to be swingable.

12. A sheet feeding device according to claim 1, wherein said positioning portion is a first positioning portion, and wherein said sheet feeding device further comprises:

(1) a portion-to-be-positioned as a first positioned portion;

(2) a second positioning portion provided in the main assembly and disposed on an upstream side than the first positioning portion with respect to the mounting direction of said sheet accommodating portion in the main assembly; and (3) a second positioned portion provided in said sheet accommodating portion and disposed so as to engage with said second positioning portion in a state in which said sheet accommodating portion is mounted at the mounting position in the main assembly, said second positioned portion being configured to position said sheet accommodating portion with respect to the crossing direction.

13. A sheet feeding device according to claim 1, wherein said engaging member includes two claw portions, wherein said engaged member is positioned between said two claw portions in a state in which said sheet feeding device is positioned at the mounting position, and wherein in a case where said sheet accommodating portion is pulled in the pulling-out direction from the mounting position, said engaged member elastically deforms said two claw portions so as to increase an interval between said two claw portions.

14. A sheet feeding device according to claim 1, wherein said engaged member comprises a boss, wherein said engaging member comprises (1) a first part provided with a first arcuate portion and (2) a second part provided with a second arcuate portion, wherein said engaging member is arranged such that said first arcuate portion covers a part of an outer periphery of said boss and said second arcuate portion covers another part of an outer periphery of said boss when said sheet accommodating portion is positioned in the mounting position, wherein in a case where said sheet accommodating portion is pulled in the pulling-out direction from the mounting position, said engaged member elastically deforms said first part and said second part so as to increase an interval between said first part and said second part, and wherein said engaging member is arranged such that a first elastic force and a second elastic force act on said sheet accommodating portion in the direction toward the mounting position.

15. A sheet feeding device according to claim 1, wherein in a case where said sheet accommodating portion is pulled out in the pulling-out direction from the mounting position, said engaging member is elastically deformed.

16. A sheet feeding device according to claim 1, wherein said engaging member is made of a resin material.

17. An image forming apparatus comprising:

a main assembly;

a sheet accommodating portion mounted in said main assembly so as to be capable of being pulled out in a pulling-out direction from a mounting position;

an image forming portion configured to form an image on a sheet fed from said sheet accommodating portion;

a positioning portion provided in said main assembly and configured to position said sheet accommodating portion mounted at the mounting position with respect to a crossing direction perpendicularly crossing the pulling-out direction of said sheet accommodating portion from said main assembly as viewed in a direction of gravitation;

an engaged member provided in one of said main assembly and said sheet accommodating portion; and an engaging member, provided in the other of said main assembly and said sheet accommodating portion, which is formed of an elastic material and which is configured to hold said sheet accommodating portion at the mounting position by being engaged with said engaged member, wherein said engaging member is elastically deformed by the engaged member and is arranged such that an elastic force of said engaging member is used to pull said sheet accommodating portion in a direction, opposite to the pulling-out direction, toward the mounting position, and wherein said engaging member is provided swingably in the other one of said main assembly and said sheet accommodating portion so as to be capable of changing a position thereof with respect to the crossing direction.

18. An image forming apparatus according to claim 17, wherein said engaging member is made of a resin material.

19. A sheet feeding device comprising:

a sheet accommodating portion mounted in a main assembly so as to be capable of being pulled out in a pulling-out direction from a mounting position, wherein with respect to a crossing direction perpendicularly crossing the pulling-out direction of said sheet accommodating portion from the main assembly as viewed in a direction of gravitation, the main assembly is provided with a positioning portion for positioning said sheet accommodating portion mounted at the mounting position;

an engaged member provided in one of the main assembly and said sheet accommodating portion; and an engaging member, provided in the other of the main assembly and said sheet accommodating portion, which is formed of an elastic material and which is configured to hold said sheet accommodating portion at the mounting position by being engaged with said engaged member, wherein said engaging member is elastically deformed by the engaged member and is arranged such that an elastic force of said engaging member is used to pull said sheet accommodating portion in a direction, opposite to the pulling-out direction, toward the mounting position, and wherein said engaging member is provided movably in the other one of the main assembly and said sheet accommodating portion so as to be capable of changing a position thereof with respect to the crossing direction.

20. A sheet feeding device according to claim 19, wherein said engaging member is made of a resin material.

* * * * *